(12) United States Patent
Tao

(10) Patent No.: US 10,216,622 B2
(45) Date of Patent: Feb. 26, 2019

(54) DIAGNOSTIC ANALYSIS AND SYMPTOM MATCHING

(71) Applicant: INTERNATIONAL BUSINESS MACHINES CORPORATION, Armonk, NY (US)

(72) Inventor: Jim J. Tao, Sewickley, PA (US)

(73) Assignee: International Business Machines Corporation, Armonk, NY (US)

(*) Notice: Subject to any disclaimer, the term of this patent is extended or adjusted under 35 U.S.C. 154(b) by 57 days.

(21) Appl. No.: 15/254,050

(22) Filed: Sep. 1, 2016

(65) Prior Publication Data
US 2018/0060225 A1 Mar. 1, 2018

(51) Int. Cl.
G06F 11/00 (2006.01)
G06F 11/36 (2006.01)

(52) U.S. Cl.
CPC ...... G06F 11/3692 (2013.01); G06F 11/3684 (2013.01); G06F 11/3688 (2013.01)

(58) Field of Classification Search
CPC ............ G06F 11/3692; G06F 11/3684; G06F 11/3688
USPC .............................................. 714/38.1–38.14
See application file for complete search history.

(56) References Cited

U.S. PATENT DOCUMENTS

| 6,681,344 | B1 | 1/2004 | Andrew |
| 7,251,584 | B1 | 7/2007 | Perazolo et al. |
| 7,263,632 | B2 | 8/2007 | Ritz et al. |
| 8,132,090 | B2 | 3/2012 | Nastacio |
| 8,321,383 | B2 | 11/2012 | Schumacher et al. |
| 8,327,191 | B2 | 12/2012 | Branca et al. |
| 8,453,027 | B2 | 5/2013 | Bartz et al. |
| 9,081,656 | B2 * | 7/2015 | Yingling, Jr. ......... G06F 11/008 |
| 2002/0116665 | A1 * | 8/2002 | Pickover .................. G06F 8/66 |
|  |  |  | 714/38.14 |
| 2004/0073844 | A1 | 4/2004 | Unkle et al. |

(Continued)

OTHER PUBLICATIONS

Brodie et al., "Quickly Finding Known Software Problems via Automated Symptom Matching", Proceedings of the Second International Conference on Autonomic Computing (ICAC'05), pp. 101-110, 2005.

(Continued)

Primary Examiner — Jason B Bryan
(74) Attorney, Agent, or Firm — Erik K. Johnson

(57) ABSTRACT

A method for resolving software problems is provided. The method may include receiving a plurality of stored error pattern data sets including a stored error pattern indicative of a historical pattern of errors and corrective action data indicative of a set of corrective action(s) designed to be used in response to the corresponding historical pattern of errors; receiving a subject error pattern data set corresponding to a subject error pattern that was experienced by a system of computing device(s); comparing the subject error pattern to each of the plurality of stored error patterns to determine a ranking of the plurality of stored error patterns for closeness to the subject error pattern, comparing positions of errors and an order errors as between the subject error pattern and the stored error pattern; presenting at least a portion of the ranking of the plurality of stored error patterns and corresponding corrective action data.

6 Claims, 9 Drawing Sheets

(56) References Cited

U.S. PATENT DOCUMENTS

| | | | |
|---|---|---|---|
| 2004/0153844 A1* | 8/2004 | Ghose | H04L 41/064 714/42 |
| 2005/0210331 A1 | 9/2005 | Connelly et al. | |
| 2007/0085716 A1 | 4/2007 | Bar-Yossef et al. | |
| 2010/0146325 A1* | 6/2010 | John | G06F 11/0793 714/3 |
| 2011/0066908 A1* | 3/2011 | Bartz | G06F 11/0709 714/746 |
| 2014/0082021 A1 | 3/2014 | Hendrey | |
| 2016/0055262 A1 | 2/2016 | Bhattacharjee et al. | |

OTHER PUBLICATIONS

Chen et al., "Pinpoint: Problem Determination in Large, Dynamic Internet Services", Proceedings of the International Conference on Dependable Systems and Networks (DSN'02), pp. 595-604, 2002 IEEE.

Levenshtein, "Binary Codes Capable of Correcting Deletions, Insertions, and Reversals", Soviet Physics—Doklady, vol. 10, No. 8, Feb. 1966, pp. 707-710.

Dinu et al., "An Efficient Rank Based Approach for Closest String and Closest Substring", IP.com, PubMed Central Publication, Publishing Venue: PLoS One, 7(6), e37576, Electronic Publication Date: Jun. 4, 2012, pp. 1-18.

Modani et al., "Automatically Identifying Known Software Problems", Proceedings of IEEE 23rd International Conference on Data Engineering Workshop, pp. 433-441, 2007.

Peng et al., Abstract for "Diagnostic problem-solving with causal chaining", International Journal of Intelligent Systems, vol. 2, Issue 3, pp. 265-302, Sep. 1987.

Mell et al., "The NIST Definition of Cloud Computing", National Institute of Standards and Technology, Special Publication 800-145, Sep. 2011, pp. 1-3.

* cited by examiner

DIAGNOSTIC ANALYSIS AND SYMPTOM MATCHING

BACKGROUND

The present invention relates to diagnostic problem resolution in computer systems.

Generally, information technology (IT) products and service offerings, such as cloud computing offerings, increasingly depend on more complex and integrated backend systems. For example, Infrastructure as a Service (IaaS), Platform as a Service (PaaS), Software as a Service (SaaS) and Data as a Service (DaaS) are forms of cloud computing that may integrate multiple internal and/or external distributed computing systems and applications from different vendors to deliver more dynamic and content rich services. Traditionally, end users and/or monitoring systems may report system or application problems associated with the integrated IT systems, and system administrators may be notified of the problems. Furthermore, the system administrators may launch an investigation to identify and resolve the system or application problems. In response to the system administrators not finding the cause and not resolving the problems, the system administrators may engage vendors of the affected systems and/or applications to find solutions.

Although diagnostic tools developed by IT companies can be used to automatically collect and visualize diagnostic information, many stages in the above mentioned troubleshooting process needs to be done manually in a heterogeneous distributed IT system, partly due to the fact that these diagnostic tools developed by different vendors may not be able to interact with each other. It leads to the long and tedious problem investigation process. Distributed systems with a significant number of interdependent subsystems and components, such as ones we may find in a cloud computing environment, will exacerbate this problem.

Some diagnostic tools with features like symptom database and diagnostic rule engine have been developed. However, due to the limited number of rules manually created by the product vendors, few of them has been widely used for troubleshooting issues of the complex enterprise IT systems.

The call stack comparison between a newly reported problem and the known issues has been proposed to detect whether the new problem matches an existing one. The algorithm used to conduct the comparison is simple and flawed. It is also limited to a stand-alone system or a product in a homogeneous environment.

There is a need in the art for improved methods and techniques to troubleshoot technical issues in a complex and distributed cloud computing environment.

SUMMARY

A method for automatically resolving at least one software problem in a complex and distributed computing environment is provided. The method may include receiving a plurality of stored error pattern data sets, with each stored error pattern data set respectively including a stored error pattern indicative of a historical pattern of errors and corrective action data indicative of a set of corrective action(s) designed to be used in response to the corresponding historical pattern of errors. The method may further include receiving a subject error pattern data set corresponding to a subject error pattern that was experienced by a system of computing device(s). Additionally, the method may include comparing, by machine logic, the subject error pattern to each of the plurality of stored error patterns to determine a ranking of the plurality of stored error patterns for closeness to the subject error pattern, with each comparison comparing positions of errors and an order errors as between the subject error pattern and the stored error pattern. The method may also include presenting a presentation indicative of at least a portion of the ranking of the plurality of stored error patterns along with respective corresponding corrective action data.

A computer system for resolving at least one software problem is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of stored error pattern data sets, with each stored error pattern data set respectively including a stored error pattern indicative of a historical pattern of errors and corrective action data indicative of a set of corrective action(s) designed to be used in response to the corresponding historical pattern of errors. The method may further include receiving a subject error pattern data set corresponding to a subject error pattern that was experienced by a system of computing device(s). Additionally, the method may include comparing, by machine logic, the subject error pattern to each of the plurality of stored error patterns to determine a ranking of the plurality of stored error patterns for closeness to the subject error pattern, with each comparison comparing positions of errors and an order errors as between the subject error pattern and the stored error pattern. The method may also include presenting a presentation indicative of at least a portion of the ranking of the plurality of stored error patterns along with respective corresponding corrective action data.

A computer program product for resolving at least one system or application problem is provided. The computer program product may include one or more computer-readable storage devices and program instructions stored on at least one of the one or more tangible storage devices, the program instructions executable by a processor. The computer program product may include program instructions to receive a plurality of stored error pattern data sets, with each stored error pattern data set respectively including a stored error pattern indicative of a historical pattern of errors and corrective action data indicative of a set of corrective action(s) designed to be used in response to the corresponding historical pattern of errors. The computer program product may further include program instructions to receive a subject error pattern data set corresponding to a subject error pattern that was experienced by a system of computing device(s). Additionally, the computer program product may also include program instructions to compare, by machine logic, the subject error pattern to each of the plurality of stored error patterns to determine a ranking of the plurality of stored error patterns for closeness to the subject error pattern, with each comparison comparing positions of errors and an order errors as between the subject error pattern and the stored error pattern. The computer program product may further include program instructions to present a presentation indicative of at least a portion of the ranking of the plurality of stored error patterns along with respective corresponding corrective action data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
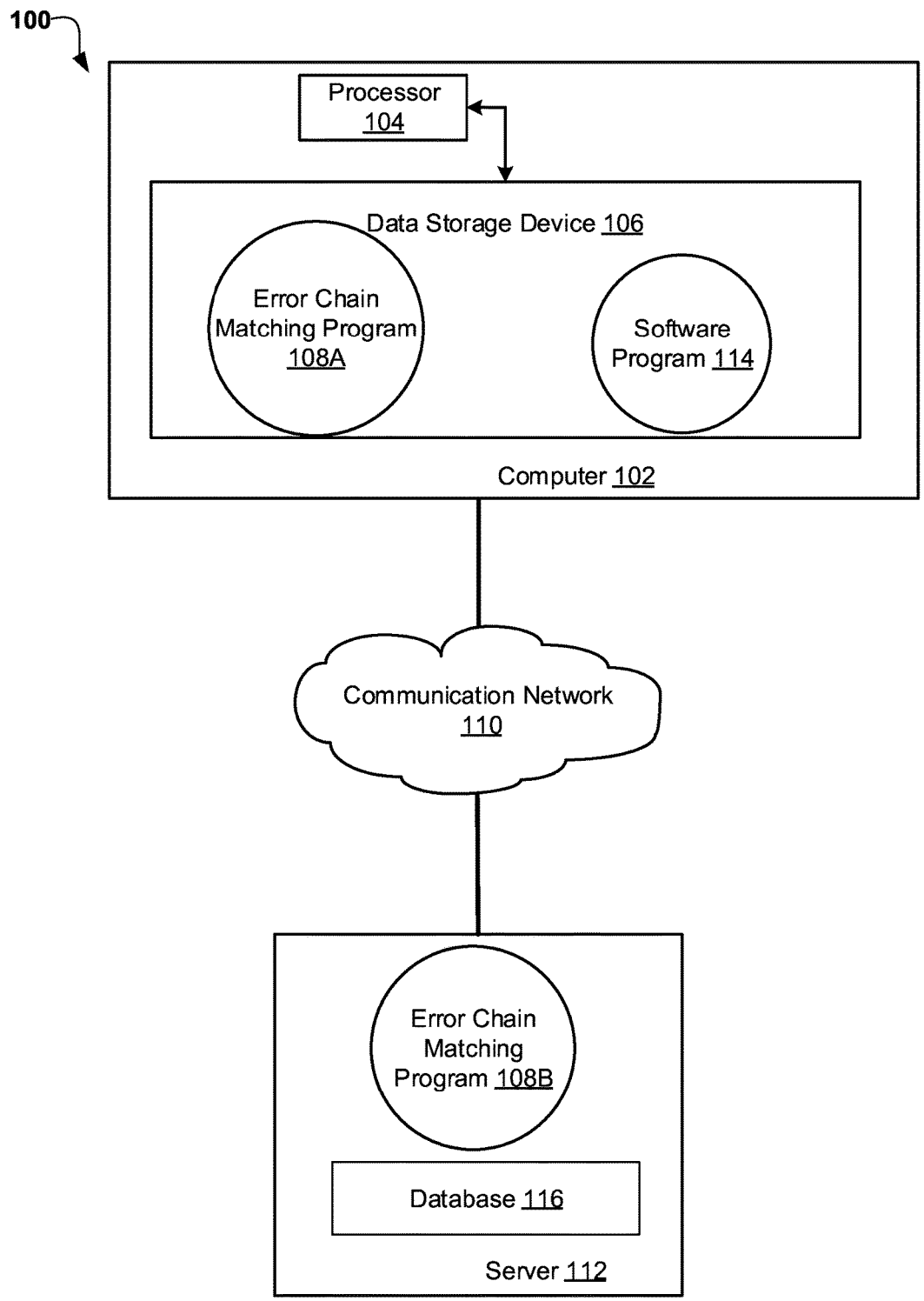
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to diagnostic problem resolution. The following described exemplary embodiments provide a system, method and program product for resolving software problems by identifying and matching error chains. Therefore, the present embodiment has the capacity to improve the technical field associated with diagnostic problem resolution by providing faster resolutions to new software problems based on matching error chains associated with the new software problems to stored/known error chains. Specifically, the present embodiment may determine resolutions to new software problems by identifying the error chains associated with the new software problems, grouping the error chains with other diagnostic data into error patterns and matching the error patterns to stored/known error patterns associated with stored/known software problems to determine stored/known resolutions.

As previously described with respect to diagnostic problem resolution, end users and/or monitoring systems may report software problems on integrated IT systems, and the system administrators may be notified. Furthermore, the system administrators may launch an investigation to identify and resolve the software problems, or in response to not resolving the software problems, engage the different vendors of the affected subsystems and/or applications to find solutions. However, engaging the different vendors is a time consuming process. Specifically, following giving a detailed description of the software problems to the different vendors, the system administrators may need to collect the corresponding diagnostic data and documents, such as product configuration information and log files, based on the instruction from each vendor. Thereafter, due to the complexity of integrated IT systems and the fact that the additional diagnostic data may need to be collected and passed among the different vendors or the different vendors' support organizations, and in different stages of a software problem investigation process, a resolution may not be reached for some time.

Furthermore, the end users and the system administrators associated with an IT environment may not be able to fully utilize different vendors' specialized diagnostic tools associated with related and/or different integrated IT environments to investigate issues and locate the root causes of software problems due to the facts that the specialized diagnostic tools usually are designed to function within the boundary of a simple product and they require the end users and the system administrators to have knowledge of product internals and training on how to use the specialized diagnostic tools. As such, it may be advantageous, among other things, to provide a system, method and program product for resolving new software problems by automatically identifying and matching error chains based on stored information in a potentially heterogeneous IT environment. Specifically, the system, method, and program product may resolve diagnostic problems by performing error chain analyses on the identified software problems to identify error chain patterns associated with the software problems and match the error chain patterns to known error chain patterns of stored software problems.

According to at least one implementation of the present embodiment, error symptom matching requests associated with new software problems may be received. Next, diagnostic data associated with the new software problems may be collected. Then, based on the collected diagnostic data, error chains associated with the new software problems may be identified and generated. Next, error patterns may be generated based on the generated error chains. Then, the error patterns associated with the new software problems may be matched to stored error patterns associated with stored software problems. Next, in response to matching the error patterns to the stored error patterns, lists of application resolutions to the new software problems may be generated and presented. Then, in response to user selections, one or more resolutions associated with the lists of resolutions may be executed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for resolving software problems by identifying and matching error chains.

Referring now to FIG. 1, an exemplary networked computer environment 100 in accordance with one embodiment is depicted. The networked computer environment 100 may include one or more computers 102 with a processor 104 and a data storage device 106 that is enabled to run an error chain matching program 108A and a software program 114. The software program 114 may be a software program such as a system program, a web application program, and an email program. The error chain matching program 108A may collect diagnostic data from the software program 114 and its dependent programs. The networked computer environment 100 may also include one or more servers 112 that is enabled to run an error chain matching program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 5, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computers 102 may be, for example, desktop computers, or any type of computing system or devices capable of running programs and accessing a network and remote programs, and may be a part of a large computing system, or a cloud computing platform. According to various implementations of the present embodiment, the error chain matching program 108A, 108B may interact with a database 116 that may be embedded in various storage devices, such as, but not limited to a client computing system 102, a networked server 112, or a cloud storage service.

According to the present embodiment, a program, such as an error chain matching program 108A and 108B may run on the client computer 102 or on the server computer 112 via a communications network 110. The error chain matching program 108A, 108B may resolving new software problems by identifying and matching error chains. Specifically, the error chain matching program 108A, 108B, may run on client computers 102 and/or servers 112 and may collect diagnostic data associated with the client computers 102, and software programs 114, and resolve new software problems associated with the client computers 102, and software programs 114 by identifying error chains associated with the new software problems, grouping the error chains with other diagnostic data into error patterns and matching the error patterns to stored/known error patterns associated with stored/known software problems to determine stored/known resolutions.

Figure 2A:
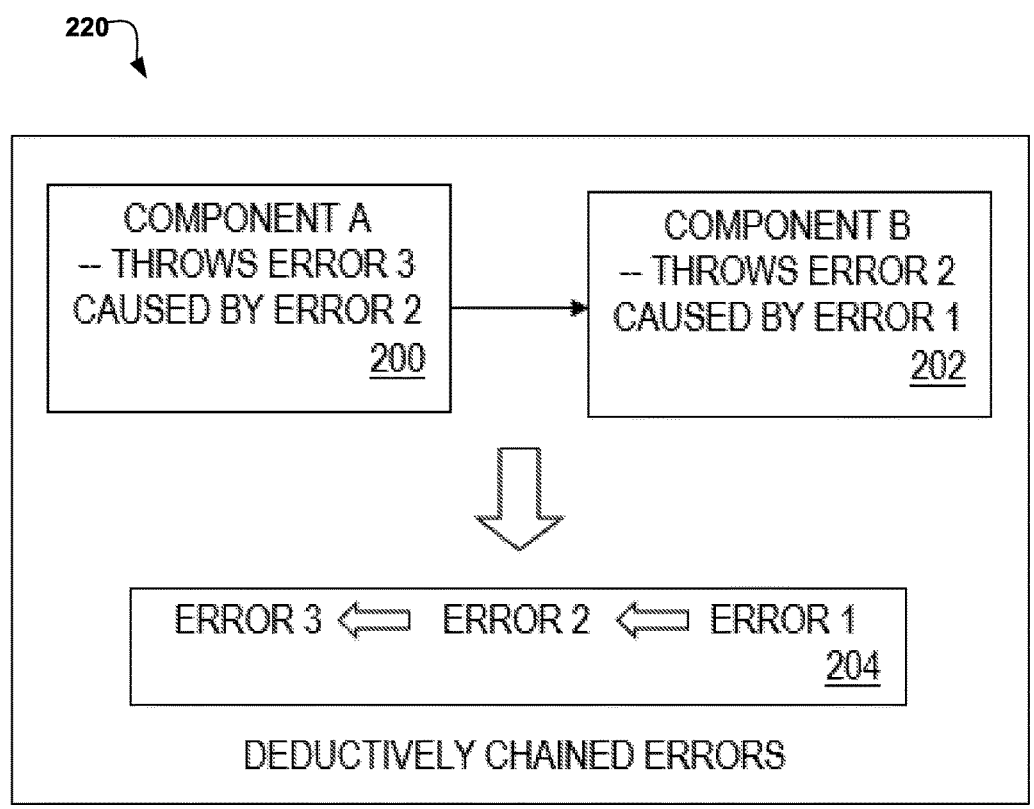
FIG. 2A is an example of an identified and generated error chain based on a deductive method according to one embodiment.

Referring now to FIG. 2A, an example of an identified and generated error chain based on a deductive method 220 is depicted. As previously described, the error chain matching program 108A, 108B (FIG. 1) may identify and generate error chains associated with new software problems based on diagnostic data associated with the new software problems. For example, the new software problems may include technical problems/issues (e.g. software and/or hardware problems/issues) that are associated with one or more computers 102 (FIG. 1) and/or software programs 114 (FIG. 1) and that are new to the one or more computers 102 (FIG. 1) and/or software programs 114 (FIG. 1). Thereafter, the error chain matching program 108A, 108B (FIG. 1) may receive error symptom matching requests based on the new software problems to match the new software problems to stored/known software problems, whereby the stored/known software problems may include software problems that were previously resolved and may contain application resolution information to resolve software problems similar to the stored/known software problems. As such, the error chain matching program 108A, 108B (FIG. 1) may collect diagnostic data associated with the new software problems to identify and generate error chains. More specifically, the error chains may be comprised of different errors, such as errors based on system failures and application failures, that are received based on the software problems that are associated with the computer 102 (FIG. 1) and/or the software program 114 (FIG. 1).

Then, according to one implementation, the error chain matching program 108A, 108B (FIG. 1) may deductively identify and generate error chains, or more specifically, deductively organize the different errors into error chains, based on the collected diagnostic data associated with the software problems. For example, based on the collected diagnostic data, the error chain matching program 108A, 108B (FIG. 1) may determine that component A 200 throws error 3 and indicates that error 3 is caused by error 2, whereby error 2 does not occur in component A 200. Then, the error chain matching program 108A, 108B (FIG. 1) may locate error 2 in component B 202 based on the diagnostic data, such as the timestamps of error 2 and error 3 and dependency information that indicates component A depends on component B. The error chain matching program 108A, 108B (FIG. 1) may further determine that error 2 is caused by error 1. As such, the error chain matching program 108A, 108B (FIG. 1) may deductively identify and generate the error chain 204 associated with the new software problem to indicate the causal connections of the identified different errors in the new software problem whereby error 1 causes error 2, and then error 2 causes error 3.

Figure 2B:
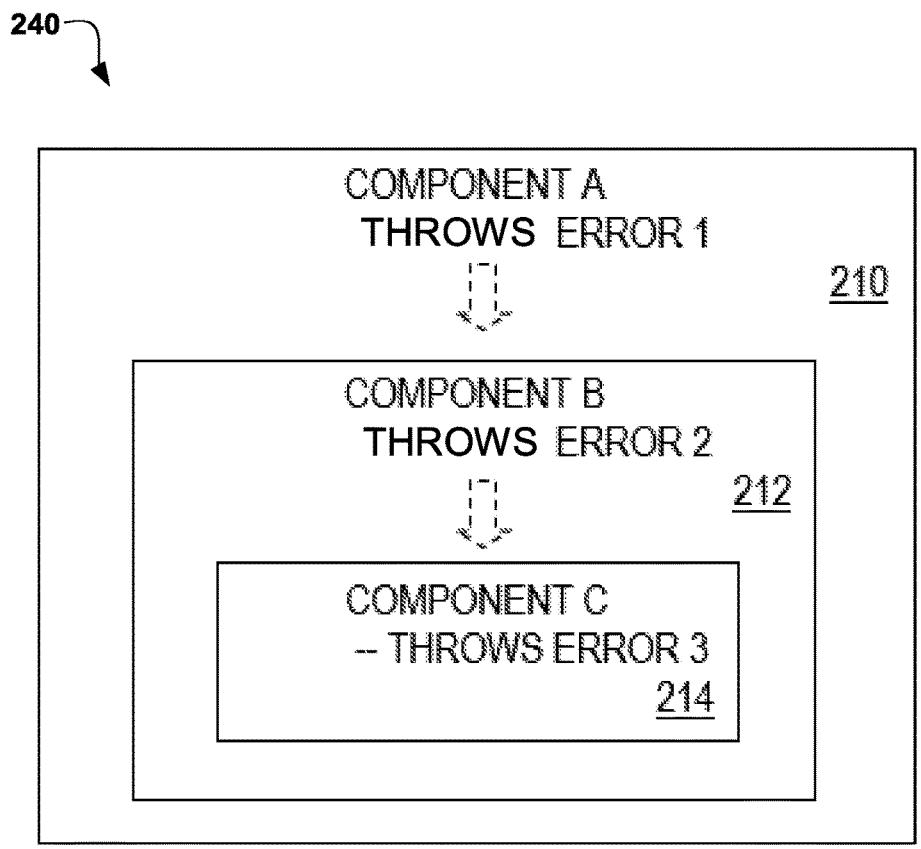
FIG. 2B is an example of an identified and generated error chain based on a heuristic method according to one embodiment.

Referring now to FIG. 2B, an example of an identified and generated error chain based on a heuristic method 240 is depicted. A heuristic method may be based on the horizontal or vertical dependency of the components, time correlation of these errors, as well as the historical error analysis data stored in an error pattern database. As previously described in FIG. 2A, the error chain matching program 108A, 108B (FIG. 1) may deductively identify and generate error chains. Alternatively, in response to not identifying one or more errors associated with the different errors, not resolving the new software problems using the deductively identified and generated error chains, and/or not identifying the causal connections between the different errors or different isolated errors, the error chain matching program 108A, 108B (FIG. 1) may use a heuristic method to identify and generate the error chains. Specifically, and according to one embodiment, by using the heuristic method, the error chain matching program 108A, 108B (FIG. 1) may identify different combinations of the identified different errors and/or identify related errors based on the collected diagnostic data to generate the error chains.

For example, an error 1 may occur in component A 210, an error 2 may occur in component B 212, and an error 3 may occur in component C 214. Furthermore, based on collected diagnostic data, the error chain matching program 108A, 108B (FIG. 1) may determine that component C 214 runs inside component B 212, and component B 212 runs inside component A 210. Therefore, using the heuristic method, and based on collected diagnostic data, such as component vertical dependency, error time correlation, known error pattern statistic data and context information, the error chain matching program 108A, 108B (FIG. 1) may generate error chains based on combinations of error 1, error 2, and error 3. For example, based on error 2 occurring in the component B 212 that depends on the component A 210, and error 1 occurring in component A 210, along with diagnostic data such as the timestamps of error 1 and error 2, the error chain matching program 108A, 108B (FIG. 1) may determine that there is a causal connection between error 1 and error 2.

Since the heuristic method is not deterministic, different combinations of the errors may satisfy the conditions to be a possible error chain. If the number of possible error chains is large, optimization methods such as genetic algorithm or simulated annealing algorithm can be utilized to identify the most promising error chain candidates.

Figure 3:
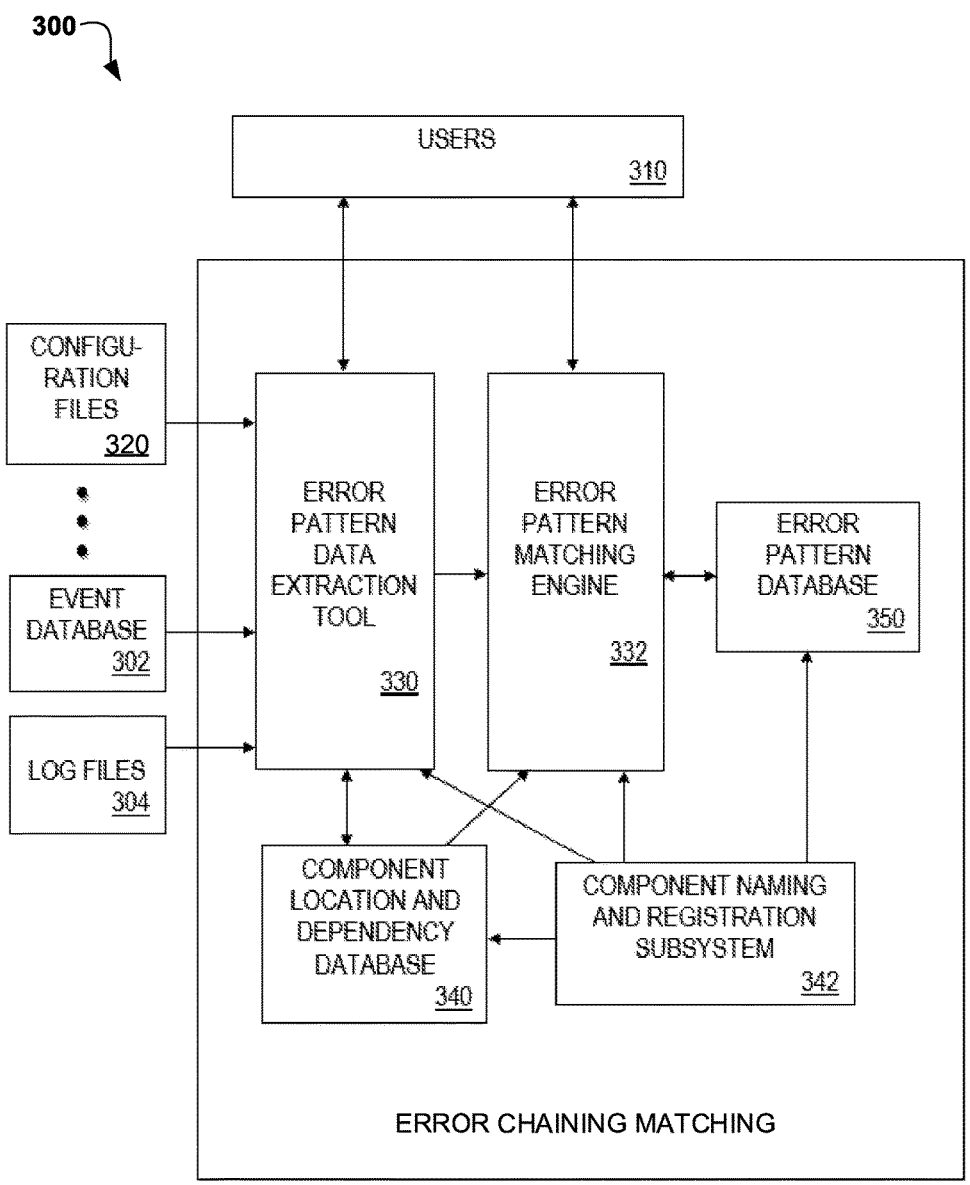
FIG. 3 is a block diagram illustrating an error chain matching program according to one embodiment.

Referring now to FIG. 3, a block diagram 300 illustrating an error chain matching program 108A, 108B (FIG. 1) according to one embodiment is depicted. Product configuration files 320, an event database 302, and log files 304 of a client computing system such as computer 102 and software program 114 may be sources from which the error chain matching program 108A, 108B (FIG. 1) may retrieve the diagnostic data of the software problems that occur in client computing systems. Furthermore, the error chain matching program 108A, 108B (FIG. 1) may enable users 310 to interact with the error chain matching program 108A, 108B (FIG. 1) to provide additional diagnostic data and review matching results. Additionally, the error chain matching program 108A, 108B (FIG. 1) may include an error pattern extraction tool 330, an error pattern matching engine 332, a component location and dependency database 340, a component naming and registration subsystem 342, and an error pattern database 350.

The error pattern data extraction tool 330 may be used to retrieve diagnostic data from the client computing systems where the software problems are reported. According to one embodiment, diagnostic data such as client system configuration, dump and log files are collected and processed by the error pattern extraction tool 330. Then, the processed diagnostic data may be passed to the error pattern matching engine 332.

The error pattern matching engine 332 may be used to receive the processed diagnostic data from the error pattern data extraction tool 330 and generate one or more error patterns associated with the new software problems. Next, the error pattern matching engine 332 may compare and match the generated error patterns with the error patterns associated with stored software problems, create a ranked list of the matched stored/known error patterns associated with stored/known software problems, and present the ranked list to the user. Specifically, according to one embodiment, the error chain matching program 108A, 108B (FIG. 1) may use the error pattern matching engine 332 to compare and match error chains and error patterns using a distance formula sensitive to the position of each error in the error chains.

The similarity of two error chain patterns is calculated based on the similarity of their error chains and other diagnostic data, such as product configuration.

The similarity/dissimilarity of two error chains is defined by the distance between them.

The distance between two chained errors may be computed based on a sequence matching algorithm. According to one embodiment, a position sensitive sequence distance algorithm proposed by this invention can be utilized.

Levenshtein distance is a metric to measure the difference between two sequences. Allowed operation by this metric is insertion, deletion and substitution. Due to its usage in approximate string matching, it is also referred to as edit distance. A string is a sequence of characters. By the same token, an error chain is a sequence of errors.

However, there are two major differences between characters in a string and errors in an error chain. The first difference is that the absolute position of each character in a string has no impact on the string matching using a metric such as Levenshtein distance. Only the order of these characters matters. On the other hand, the position of each error in an error chain has a direct impact on calculating the position sensitive distance between two error chains. Position weights are introduced to measure the importance of each position occupied by an error in an error chain. The highest value of the position weights is assigned to the error which is at the beginning of the chain. The reason is that this particular error potentially indicates the root cause of the problem. The value for the last error in the chain usually is higher than the values of the errors in the middle of the chain since it may be the error that directly leads to the symptom that the user reports. That is, both the order and the position of each error in error chains are used to calculate the similarity between two error chains.

The second difference is that there is usually no similarity measure between individual characters. They are either exactly the same or simply different. On the other hand, there are different levels of similarity between two errors according to their characteristics, such as error message, stack trace and their position in the chains. The different levels of such error similarity is used to calculate position-dissimilarity weights used in the position sensitive distance.

According to one embodiment, the position sensitive distance (PSD) between two error chains, a and b, is defined in a recursive form. Function (1) specifies $PSD_{a,b}$:

$$PSD_{a,b}(i,j) = \begin{cases} \max\left(\sum_{k=1}^{i} w_a(k), \sum_{k=1}^{j} w_b(k)\right) & \text{if } \min(i,j) = 0 \\ \min\begin{cases} PSD(i-1,j) + w_a(i) \\ PSD(i,j-1) + w_b(j) \\ PSD(i-1,j-1) + w_{a,b}(i,j) \end{cases} & \text{otherwise} \end{cases} \quad (1)$$

In Function (1), $PSD_{a,b}(i,j)$ is the position sensitive distance between the first i errors of error chain a and the first j errors of error chain b. Function max and min are the standard math functions returning the maximum and the minimum element of a set. $w_a(i)$ is the normalized position weight of the $i^{th}$ error in error chain a. $w_b(j)$ is the normalized position weight of the $j^{th}$ error in error chain b. $w_{a,b}(i,j)$ is the normalized position-dissimilarity weight of the $i^{th}$ error in error chain a and the $j^{th}$ error in error chain b. The value of these weights are between 0 and 1, inclusive.

In certain embodiments, quadratic function is used to calculate the position weights (W) of each error in the chain. It may be designed to give the largest position weight to the error at the beginning. The errors close to the middle are assigned to the relatively low position weights. Function (2) defines $W_a$ for error chain a:

$$W_a(i) = k_a(i/L_a - \alpha_a)^2 + \beta_a \qquad (2)$$

In Function (2), $W_a(i)$ is the position weight assigned to the $i^{th}$ error of the error chain a. $k_a$ is a positive coefficient that controls the shape of the quadratic function. The value of $k_a$ may be increased if the length of the chain is large or if the errors in the middle of the error chain a is generally less relevant to the root causes of the issue. $L_a$ is the length of the error chain a, specifically the number of errors in the error chain a. Function (2) is applicable only if the value of $L_a$ is larger than 1. $\alpha_a$ and $\beta_a$ are adjustable parameters to decide the location of the vertex of the quadratic function. $\beta_a$ is a positive value to ensure that the value of weight $W_a(i)$ is always positive. The values of $\alpha_a$ and $\beta_a$ are influenced by the length of the error chain $L_a$. For example, in certain embodiment, $\alpha_a$ is calculated by Formula (3):

$$\alpha_a = 0.8 \times (0.3^{L_a} + 1) L_a \geq 2 \qquad (3)$$

The value of $\alpha_a$ specified by Formula (3) satisfies the requirements that the largest weight is assigned to the first error of the chain which is potentially the root cause of the problem, and that the smallest values are assigned to the errors between the middle and the end of the error chain.

Normalized position weight $w_a(i)$ is the normalized value of position weight $W_a(i)$, given by Function (4):

$$w_a(i) = W_a \bigg/ \sum_{i=1}^{L_a} W_a(i) \qquad (4)$$

By the same token, position weight $W_b(j)$ and normalized position weight $w_b(i)$ may be defined accordingly for error chain b.

In certain embodiments, position-dissimilarity weight $w_{a,b}(i,j)$ is calculated based on both the normalized position weights and the dissimilarity of two errors: the $i^{th}$ error in error chain a and the $j^{th}$ error in error chain b. It's range is $[0, \max(w_a(i), w_b(j))]$, which implies that the substitution operation is permitted during the error chain matching process.

The errors may be considered exactly the same if they have the same error type, error identification ID, error message, stack trace, relevant product configuration, etc. The value of $w_{a,b}(i,j)$ is 0 in this case.

The errors may be considered completely different if they are generated by different types of products, or they have different error type and error ID. The value of $w_{a,b}(i,j)$ is $\max(w_a(i), w_b(j))$ in this case.

The errors may be considered similar if they have the same or compatible error type and error ID, as well as similar but different error messages, stack traces or other related diagnostic data such as the information regarding product configuration or product deployment environment.

Two error types are considered as compatible if one belongs to a more general type of the other one in their error type hierarchy.

The dissimilarity of error messages between two errors may be measured using Levenshtein distance.

The dissimilarity of an error stack trace between two errors may be measured using position sensitive distance with a weight function which assigns more weight to the stack frames at the top, assuming the invocation chain starts at the bottom. In other words, the similarity of the function/method calls closer to the location where the error occurs carries more weight than the similarity of the calls further back down the invocation chain between two stack traces.

In certain embodiments, there is no similarity measures for product configuration. The two configurations are either the same/compatible or different. If they are different, the two errors may be classified as different errors. For example, two errors may be classified as different errors if one errors only occurs when a specific product setting is set to a specific value while another errors is observed when the setting is set to a different value.

In certain embodiments, if the context information, such product versions and configuration settings indicate that the $i^{th}$ error in error chain a and the $j^{th}$ error in error chain b are compatible, the combined dissimilarity measure $w_{a,b}(i,j)$ of these two errors are calculated using Function (5):

$$w_{a,b}(i,j) = \left( \sum_{k=1}^{M} c_k d_k \bigg/ \sum_{k=1}^{M} c_k \right) \times \max(w_a(i), w_b(j)) \qquad (5)$$

In Function (5), M represents the number of these two errors' properties that are used to measure the dissimilarity of the two errors. $d_k$ is the dissimilarity measure of the $k^{th}$ property of the two errors. Its value is between 0 and 1, inclusive. $c_k$ is the relative importance coefficient of the $k^{th}$ property comparing with other properties in term of dissimilarity measures.

More specifically, the value of the relative importance coefficient $c_k$ is domain and situation dependent. The first part of Function (5), $$\left( \sum_{k=1}^{M} s_k c_k \bigg/ \sum_{k=1}^{M} c_k \right),$$

can be viewed as a linear classifier function where theses coefficient $c_k$ (k=1~M) are the parameters of this linear classifier function. In certain embodiments, the optimal value of these parameters may be derived from the existing training data with supervised learning algorithms, such as gradient descent or limited-memory Broyden-Fletcher-Goldfarb-Shanno (BFGS).

The overall similarity between two error patterns, referred to as similarity confidence level, is measured by the similarity of their elements, such as their error chains, their relevant product or module versions, configuration and deployment settings, etc.

If there are more than one error chains in either or both of the two matching error patterns, the best matched error chains in the patterns according to their similarity measures are paired up.

The importance of each element of an error pattern may be quantified. In certain embodiments, the importance of an error pattern's element is measured by a relative importance indicator, similar to the aforementioned relative importance coefficient defined for measuring the importance of each property of an error in the error dissimilarity calculation. The values of the indicators for a known error pattern may be specified by the error pattern creator. The values of the indicators for a new error pattern generated by the method, system, and computer program product may take the predefined default value for each type of the elements.

Also, according to one embodiment, the error chain matching program 108A, 108B (FIG. 1) may use the error pattern matching engine 332 to calculate and present a similarity confidence level for each matched stored/known error pattern associated with the stored/known software problems to users. Specifically, the error chain matching program 108A, 108B (FIG. 1) may use the error pattern matching engine 332 to calculate and present the similarity confidence level to indicate the level of similarity between the error patterns associated with the new software problems and the matched stored error patterns associated with the stored/known software problems.

According to one embodiment, the error chain matching program 108A, 108B (FIG. 1) may enable users 310 to provide additional diagnostic data, or direct the error pattern data extraction tool 330 to provide additional diagnostic data. The error pattern matching engine 332 may then process the additional diagnostic data and perform the matching process again. Then, the error chain matching program 108A, 108B (FIG. 1) may provide the new matching results to the user 310.

The component location and dependency database 340 may store the physical and logic location information, as well as the dependency information, of components associated with client computing systems 102 and servers 112 (FIG. 1) that may be collected by the error pattern data extraction tool 330 or reported by users. Specifically, the component location and dependency database 340 may store the information to avoid repeatedly collecting such information each time error symptom matching requests are received. According to one embodiment, the error chain matching program 108A, 108B (FIG. 1) may use ontology technologies, such as resource description framework (RDF), to describe the location and dependency relationship information.

The component naming and registration subsystem 342 may be used to register and store the naming information of each component of client computing systems 102 and servers 112 (FIG. 1). Specifically, each component may be assigned a unique ID during the system and component registration process. The component IDs may be used to mark each piece of collected diagnostic data, such as an error message, to allow the error pattern matching engine 332 to record the diagnostic data by mapping each diagnostic data item to the owning component. According to one embodiment, the component naming and registration subsystem 342 may also store updated information on how to retrieve the diagnostic data from each component.

According to one embodiment, the error chain matching program 108A, 108B (FIG. 1) may also include a global computing product naming and registration system (not shown) to facilitate the product naming registration. Specifically, using the global naming and registration system, the error chain matching program 108A, 108B (FIG. 1) may enable computing product vendors to provide naming information of the components of computing product vendors' products. More specifically, the naming information may include information on how to map a diagnostic data item to its owning component, as well as how to identify the fully qualified name of a diagnostic data item specified by its product vendor based on a global component and configuration naming scheme.

The error pattern database 350 may store software problems, error chains, and error patterns that are associated with known product/software problems to client computing systems 102 (FIG. 1). The content of the error pattern database 350, such as error patterns, are published or validated by product vendors. According to one embodiment, the error chain matching program 108A, 108B (FIG. 1) may enable users 310 to submit error pattern requests or provide additional information to the stored/known error patterns. According to one embodiment, to facilitate the sharing of error patterns, the error chain matching program 108A, 108B (FIG. 1) may include a global error pattern database (not shown) that is the federation of one or more error pattern databases 350 and contains a complete set of error patterns associated with client computing systems 102 (FIG. 1).

Figure 4A:
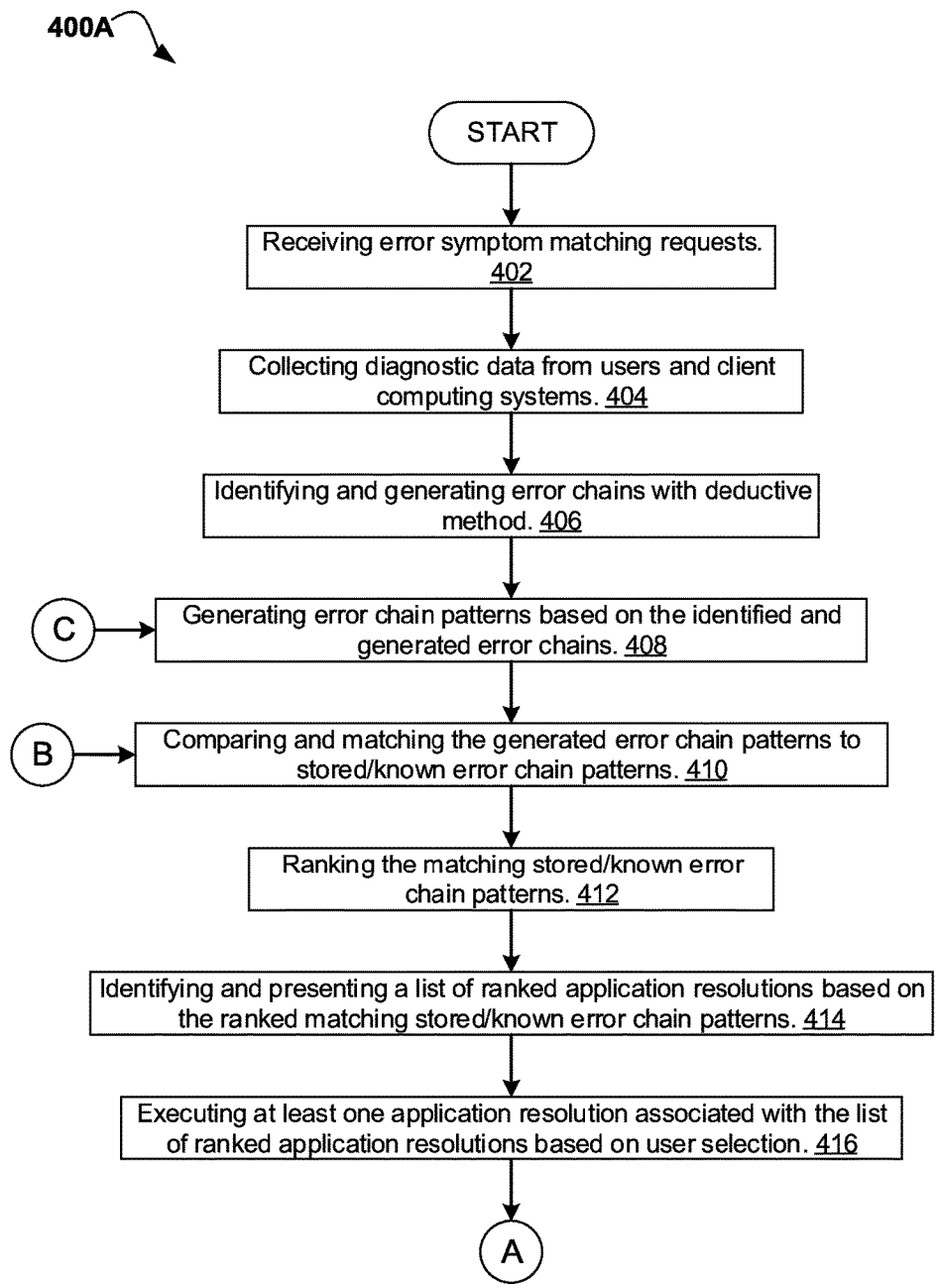
FIG. 4A is an operational flowchart illustrating the steps carried out by a program for resolving software problems by identifying and matching error chains according to one embodiment.

Referring now to FIG. 4A, an operational flowchart 400A illustrating the steps carried out by a program for resolving software problems by identifying and matching error chains is depicted. At 402, the error chain matching program 108A, 108B (FIG. 1) may receive error symptom matching requests. As previously described in FIGS. 2A and 2B, the new software problems may include application software problems, and problems associated with system software (e.g. distributed operating system), and cloud computing platforms that are associated with one or more computers 102 (FIG. 1) and/or software programs 114 (FIG. 1). Thereafter, the error chain matching program 108A, 108B (FIG. 1) may receive error symptom matching requests based on the new software problems to match the new software problems to stored/known software problems. Specifically, the error chain matching program 108A, 108B (FIG. 1) may receive the error symptom matching requests automatically from one or more client computing systems such as the computers 102 (FIG. 1) and/or software programs 114 (FIG. 1) that are affected by the new software problems, or based on user input, such as a user clicking on button to send the error symptom matching requests, whereby the button may be a "yes" button that is included in a dialogue box that asks the user 310 (FIG. 3) whether to send an error symptom matching request "yes" or "no." Furthermore, the received error symptom matching requests may include diagnostic data such as the type, location, time and frequency of the new software problems, as well as the error message the user 310 (FIG. 3) received and the changes the user made to the client computing system 102 and 114 (FIG. 1) before the new software problems occurred.

Then, at 404, the error chain matching program 108A, 108B (FIG. 1) may collect diagnostic data from users 310 (FIG. 3) and client computing systems 102 and software programs 114 (FIG. 1). As previously described at step 402, the error chain matching program 108A, 108B (FIG. 1) may receive error symptom matching requests based on new software problems that are associated with client computing systems. Specifically, and as previously described, the received error symptom matching request may include diagnostic data such as the type, location, time and frequency of the new software problems, as well as the error message the user 310 (FIG. 3) received and the changes the user made to the client computing system before the new software problem occurred. Additionally, the error chain matching program 108A, 108B (FIG. 1) may collect, based on user input and/or based on information provided from the client computing systems affected by the new software problem, diagnostic data that may include system and product versions associated with the client computing systems, configuration and deployment information, log and trace files, system dump files, and system event information. Furthermore, and as previously described in FIG. 3, the error chain matching program 108A, 108B (FIG. 1) may use the error pattern data extraction tool 330 (FIG. 3) to retrieve from the component location and dependency database 340 (FIG. 3) the identity and location of the components in the client computing systems that are associated with the new software problems. Then, according to one embodiment, the error pattern data extraction tool 330 (FIG. 3) may forward the diagnostic data to the error pattern matching engine 332 (FIG. 3) when the collection is completed.

Next, at 406, the error chain matching program 108A, 108B (FIG. 1) may identify and generate error chains. Specifically, and as previously described in FIG. 3, the error chain matching program 108A, 108B (FIG. 1) may use the error pattern matching engine 332 (FIG. 3) to identify the error chains associated with the new software problems. Furthermore, and as previously described in FIG. 2A, the error chain matching program 108A, 108B (FIG. 1) may deductively identify and generate error chains, or more specifically, deductively organize different errors associated with the new software problems into error chains, based on the collected diagnostic data associated with the new software problems and the causal connections between the different errors.

For example, and as previously described in FIG. 2A, based on the collected diagnostic data, the error chain matching program 108A, 108B (FIG. 1) may determine that component A 200 (FIG. 2A) throws error 3 and indicates that error 3 is caused by error 2, whereby error 2 does not occur in component A 200 (FIG. 2). Then, the error chain matching program 108A, 108B (FIG. 1) may locate error 2 in component B 202 (FIG. 2A) based on the diagnostic data, such as the timestamps of error 2 and error 3 and dependency information that indicates component A 200 (FIG. 2A) depends on component B 202 (FIG. 2A). The error chain matching program 108A, 108B (FIG. 1) may further determine that error 2 is caused by error 1. As such, the error chain matching program 108A, 108B (FIG. 1) may deductively identify and generate the error chain 204 (FIG. 2A) associated with the new software problem to indicate the causal connections of the identified different errors in the new software problem whereby error 1 causes error 2, and then error 2 causes error 3.

Then, at 408, the error chain matching program 108A, 108B (FIG. 1) may generate error patterns based on the identified and generated error chains, the collected diagnostic data, and statistical data.

According to one embodiment, an error pattern may contain a plurality of error chains. The criteria of selecting error chains and grouping them with other diagnostic data into an error pattern is partially governed by the statistic data of the related known error patterns. For example, if the known error patterns for certain type of components usually contain more than one error chains, the error pattern matching engine may tend to group more than one error chains into an error pattern to maximize the chance of finding the matching error patterns. The time and location of error occurrence, for instance, is also employed as part of the criteria to group error chains. If the search space is large, heuristic approaches may be utilized to search for the error chain combinations that maximize the probability to find the matching error chains of known issues.

Specifically, according to one embodiment, the error chain matching program 108A, 108B (FIG. 1) may use the error pattern matching engine 332 (FIG. 3) to generate one or more error patterns by combining the identified and generated error chains with error chains based on the diagnostic data and statistical data that may identify one or more additional errors that are related to the identified and generated error chains. More specifically, the error chain matching program 108A, 108B (FIG. 1) may identify the one or more errors that are related to the identified and generated error chains, generate new error chains based on the one or more additional errors, and use the new identified and generated error chains to form additional generated error patterns.

Next, at 410, the error chain matching program 108A, 108B (FIG. 1) may compare and match the generated error patterns to stored/known error patterns. Specifically, the error chain matching program 108A, 108B (FIG. 1) may compare and match the generated error chains associated with the generated error patterns to the stored/known error chains associated with the stored/known error patterns that may be stored on and retrieved from the error pattern database 350 (FIG. 3). More specifically, and as previously described in FIG. 3, the error chain matching program 108A, 108B (FIG. 1) may compare the generated error patterns with the stored/known error patterns by using a position sensitive distance (PSD) formula. According to one embodiment, the error chain matching program 108A, 108B (FIG. 1) may use the PSD to calculate the degree of similarity between the new generated error chains and the stored/known error chains. Furthermore, when comparing and matching the generated error chains with the stored/known error chains, the PSD may place more weight on the first error and the last error in the generated error chains and the stored/known error chains in forming a match, and less weight on the errors in the middle of the error chains.

For example, based on receiving a symptom matching request associated with a new software problem, the error chain matching program 108A, 108B (FIG. 1) may identify and generate an error chain such as error 1→error 2→error 3→error 4, and may group the generated error chain with one or more different error chains to form an error pattern. Thereafter, the error chain matching program 108A, 108B (FIG. 1) may use the PSD to compare and match each error in the generated error chains of the generated error patterns to the position of each error in the stored/known error chains within the stored/known error patterns, whereby the stored/known error patterns may include error chains such as (a) error 4→error 2→error 3→error 1, and (b) error 1→error 3→error 2→error 4. Therefore, because the first error in the identified and generated error chain is error 1, and the last error in the identified and generated error chain is error 4, the error chain matching program 108A, 108B (FIG. 1) may use the PSD to determine that the stored/known error chain (b) matches the generated error chain more than the stored/known error chain (a). As such, the error chain matching program 108A, 108B (FIG. 1) may use the PSD to score the stored/known error chain(a) as 0.643 and score the stored/known error chain(b) as 0.107, whereby the lower score (b) indicates the better match. If Levenshtein distance is used in the matching, the stored/known symptom error chains (a) and (b) will have the same score. This illustrates why PSD is better than Levenshtein distance in comparing error chains.

Then, at 412, the error chain matching program 108A, 108B (FIG. 1) may rank the matching stored/known error patterns. As previously described at step 410, it may compare and match the generated error patterns to stored/known error patterns using the PSD formula. Specifically, the error chain matching program 108A, 108B (FIG. 1) may use the PSD to score matching stored/known error chains associated with the stored/known error patterns. Thereafter, the error chain matching program 108A, 108B (FIG. 1) may rank the matching stored/known error patterns based on the PSD scores for the matching stored/known error chains and the matching scores of other diagnostic data associated with the matching stored/known error patterns.

Next, at 414, the error chain matching program 108A, 108B (FIG. 1) may identify and present a list of ranked application resolutions based on the ranked matching stored/known error patterns. As previously described at step 412, the error chain matching program 108A, 108B (FIG. 1) may rank the matching stored/known error patterns by using the PSD to score the stored/known error chains. Thereafter, the error chain matching program 108A, 108B (FIG. 1) may identify application resolutions that are associated with the ranked matching stored/known error patterns, and present the ranked matching stored/known error patterns and a list of the application resolutions in ranking order based on the ranked matching stored/known error patterns that are associated with the application resolutions. For example, and as continued from the previous example, the error chain matching program 108A, 108B (FIG. 1) may rank the stored/known error chain (b) higher than the stored/known error chain (a). Therefore, the error chain matching program 108A, 108B (FIG. 1) may identify and present an application resolution associated with the stored/known error chain (b) higher on the list than an application resolution associated with the stored/known error chain(a). Furthermore, according to one embodiment, and as previously described in FIG. 3, the error chain matching program 108A, 108B (FIG. 1) may use the error pattern matching engine 332 to present a similarity confidence level for each ranked matching stored/known error patterns, whereby the similarity confidence level may be used to indicate the level of similarity between the identified and generated error patterns and the matched stored/known error patterns.

Then, at 416, the error chain matching program 108A, 108B (FIG. 1) may execute at least one application resolution associated with the list of ranked application resolutions based on user selection. As previously described at step 414, the error chain matching program 108A, 108B (FIG. 1) may identify application resolutions that are associated with the ranked matching stored/known error patterns, and present the ranked matching stored/known error patterns and a list of the application resolutions in ranking order based on the ranked matching stored/known error patterns that are associated with the application resolutions. Thereafter, the error chain matching program 108A, 108B (FIG. 1) may enable users to select or implement at least one of the application resolutions to resolve the new software problem associated with the received error symptom matching request.

Figure 4B:
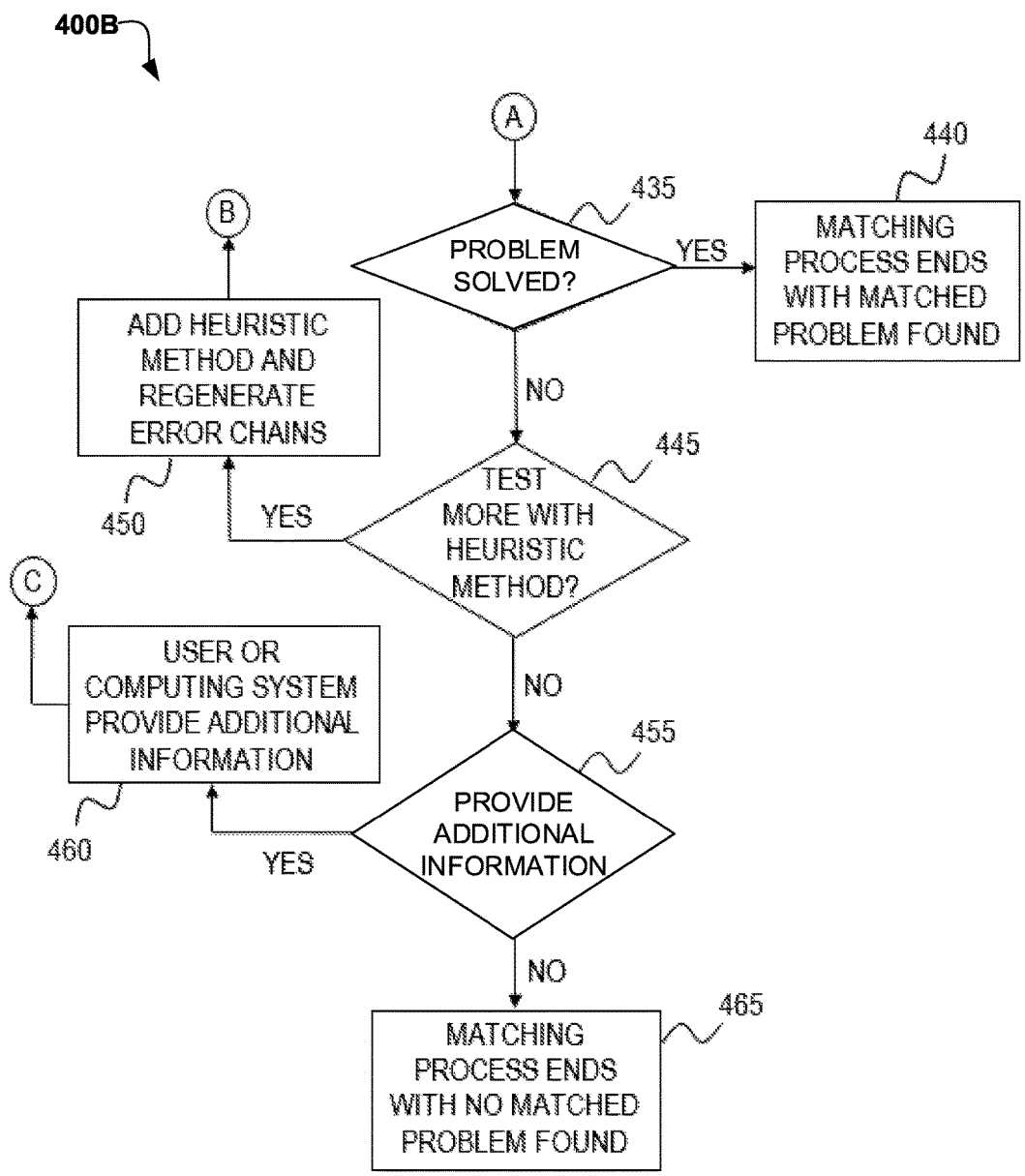
FIG. 4B is an operational flowchart illustrating continuing steps carried out by a program for resolving software problems by identifying and matching error chains according to one embodiment.

Referring now to FIG. 4B, an operational flowchart 400B illustrating the continuing steps carried out by the program for resolving software problems by identifying and matching error chains is depicted. At 435, the error chain matching program 108A, 108B (FIG. 1) may be informed by the user 310 (FIG. 3) or the client computing system 102 (FIG. 1) on whether the executed application resolution resolved the new software problem. For example, the error chain matching program 108A, 108B (FIG. 1) may determine whether the executed application resolution resolved the new software problem by receiving an error message indicating that the executed application resolution did not resolve the new software problem, or receiving a successfully completed message indicating that the executed application resolution resolved the new software problem.

At 440, in response to the executed application resolution resolving the new software problem at step 435, the error chain matching program 108A, 108B (FIG. 1) may conclude the matching process. Furthermore, according to one embodiment, the error chain matching program 108A, 108B (FIG. 1) may store the diagnostic data associated with the new software problem, the identified and generated error chains and error patterns associated with the new software problem, and the executed application resolution that resolved the new software problem in database such as a database 116 (FIG. 1).

At 445, in response to the executed application resolution not resolving the new software problem at step 435, the error chain matching program 108A, 108B (FIG. 1) may determine whether additional error chains may be identified and generated using the heuristic method. Specifically, the error chain matching program 108A, 108B (FIG. 1) may query users 310 (FIG. 3), for example, using a dialogue box, to enable users to select identifying and generating additional error chains using the heuristic method.

As such, at 450, in response to the determination that the user selected identifying and generating additional error chains using the heuristic method at step 445, the error chain matching program 108A, 108B (FIG. 1) may use the heuristic method to identify and generate additional error chains. Specifically, and as previously described in FIG. 2B, by using the heuristic method, the error chain matching program 108A, 108B (FIG. 1) may generate different combinations of the identified errors, and/or identify related errors based on the collected diagnostic data, to generate the error chains. Thereafter, the error chain matching program 108A, 108B (FIG. 1) may return to step 410 in FIG. 4A as indicated by the letter "B" in FIGS. 4A and 4B.

Alternatively, at 455, in response to the determination that the user selected to not identify and generate additional error chains using the heuristic method at step 445, the error chain matching program 108A, 108B (FIG. 1) may determine whether additional information associated with the application resolution may be provided. Specifically, the error chain matching program 108A, 108B (FIG. 1) may query users 310 (FIG. 3), for example, using a dialogue box, to enable users 310 (FIG. 3) to provide additional information associated with the new software problem.

As such, at 460, in response to the determination that additional information associated with the new software problem may be provided at step 455, the error chain matching program 108A, 108B (FIG. 1) may enable users 310 (FIG. 3) to provide additional information, or the information may be provided by the client computing systems. For example, the error chain matching program 108A, 108B (FIG. 1) may enable users to provide the additional information by actions such as selecting/deselecting a specific error pattern, providing additional component naming or dependency information when the information is missing from the component naming and registration subsystem 342 (FIG. 3) or the component location and dependency database 340 (FIG. 3), and/or directing the error chain matching program 108A, 108B (FIG. 1) to collect specific information from the client computing system. Thereafter, the error chain matching program 108A, 108B (FIG. 1) may return to step 408 in FIG. 4A as indicated by the letter "C" in FIGS. 4A and 4B.

Alternatively, at 465, in response to the determination by user 310 (FIG. 3) that no additional information associated with the new software problem may be provided, the error chain matching program 108A, 108B (FIG. 1) may conclude the matching process.

It may be appreciated that FIGS. 2-4B provide only illustrations of one implementation and does not imply any limitations with regard to how different embodiments may be implemented. Many modifications to the depicted environments may be made based on design and implementation requirements. For example, at step 445 in FIG. 4B, in response to the executed application resolution not resolving the new software problem, the error chain matching program 108A, 108B (FIG. 1) may present the list of application resolutions again to enable users to select different application resolutions.

Figure 5:
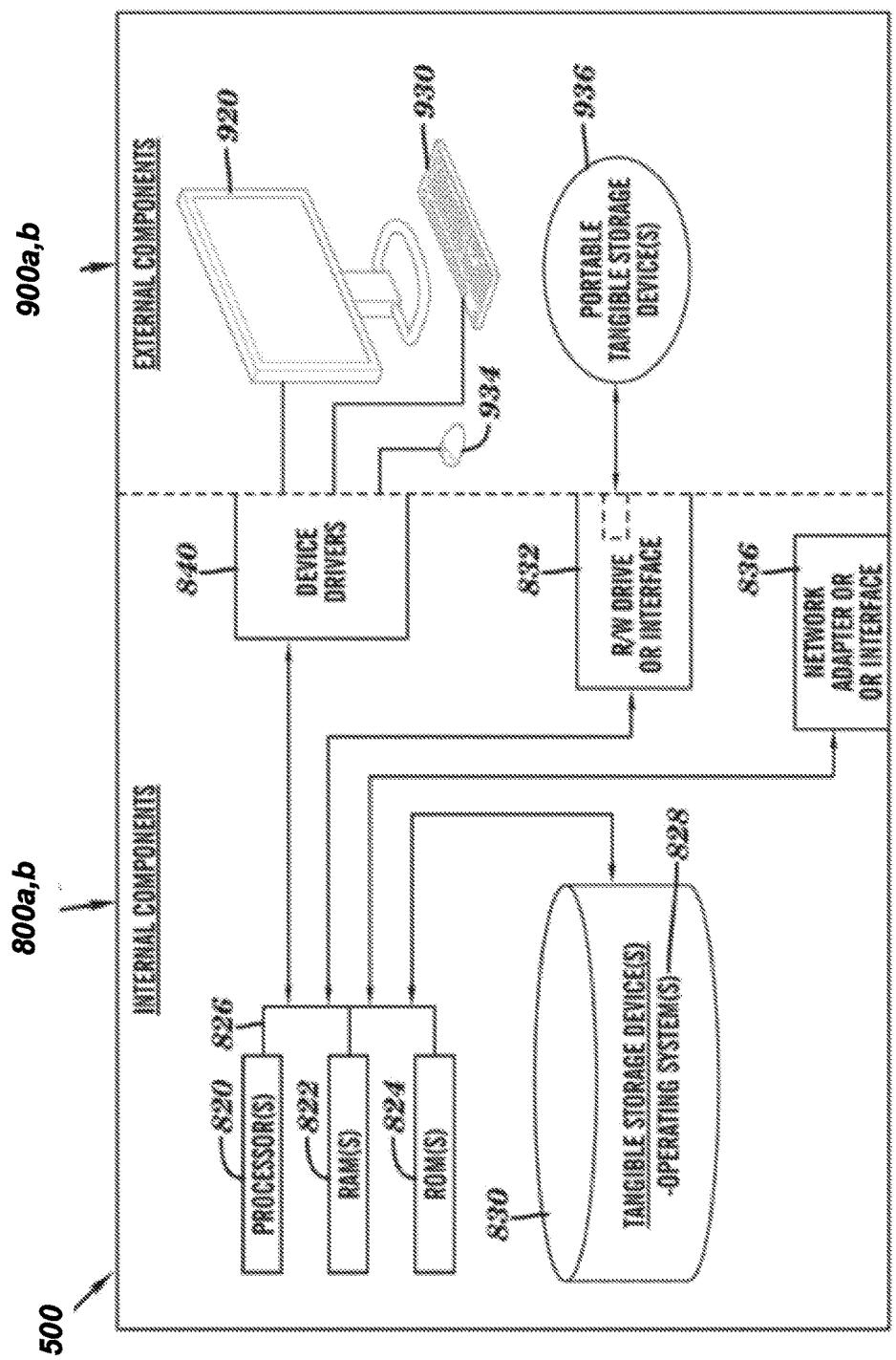
FIG. 5 is a block diagram of the system architecture of a program for resolving software problems by identifying and matching error chains according to one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, personal digital assistant (PDA), or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a,b and external components 900a,b illustrated in FIG. 5. Each of the sets of internal components 800a,b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the error chain matching program 108A (FIG. 1) in client computer 102 (FIG. 1), and the error chain matching program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an error chain matching program 108A and 108B (FIG. 1), can be stored on one or more of the respective portable computer-readable tangible storage devices 936, read via the respective R/W drive or interface 832, and loaded into the respective hard drive 830.

Each set of internal components 800a,b also includes network adapters or interfaces 836 such as a TCP/IP adapter cards, wireless Wi-Fi interface cards, or 3G or 4G wireless interface cards or other wired or wireless communication links. The error chain matching program 108A (FIG. 1) and software program 114 (FIG. 1) in client computer 102 (FIG. 1), and the error chain matching program 108B (FIG. 1) in network server 112 (FIG. 1) can be downloaded to client computer 102 (FIG. 1) and network server 112 (FIG. 1) from an external computer via a network (for example, the Internet, a local area network or other, wide area network) and respective network adapters or interfaces 836. From the network adapters or interfaces 836, the error chain matching program 108A (FIG. 1) and software program 114 (FIG. 1) in client computer 102 (FIG. 1) and the error chain matching program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900a,b can include a computer display monitor 920, a keyboard 930, and a computer mouse 934. External components 900a,b can also include touch screens, virtual keyboards, touch pads, pointing devices, and other human interface devices. Each of the sets of internal components 800a,b also includes device drivers 840 to interface to computer display monitor 920, keyboard 930, and computer mouse 934. The device drivers 840, read/write (R/W) drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
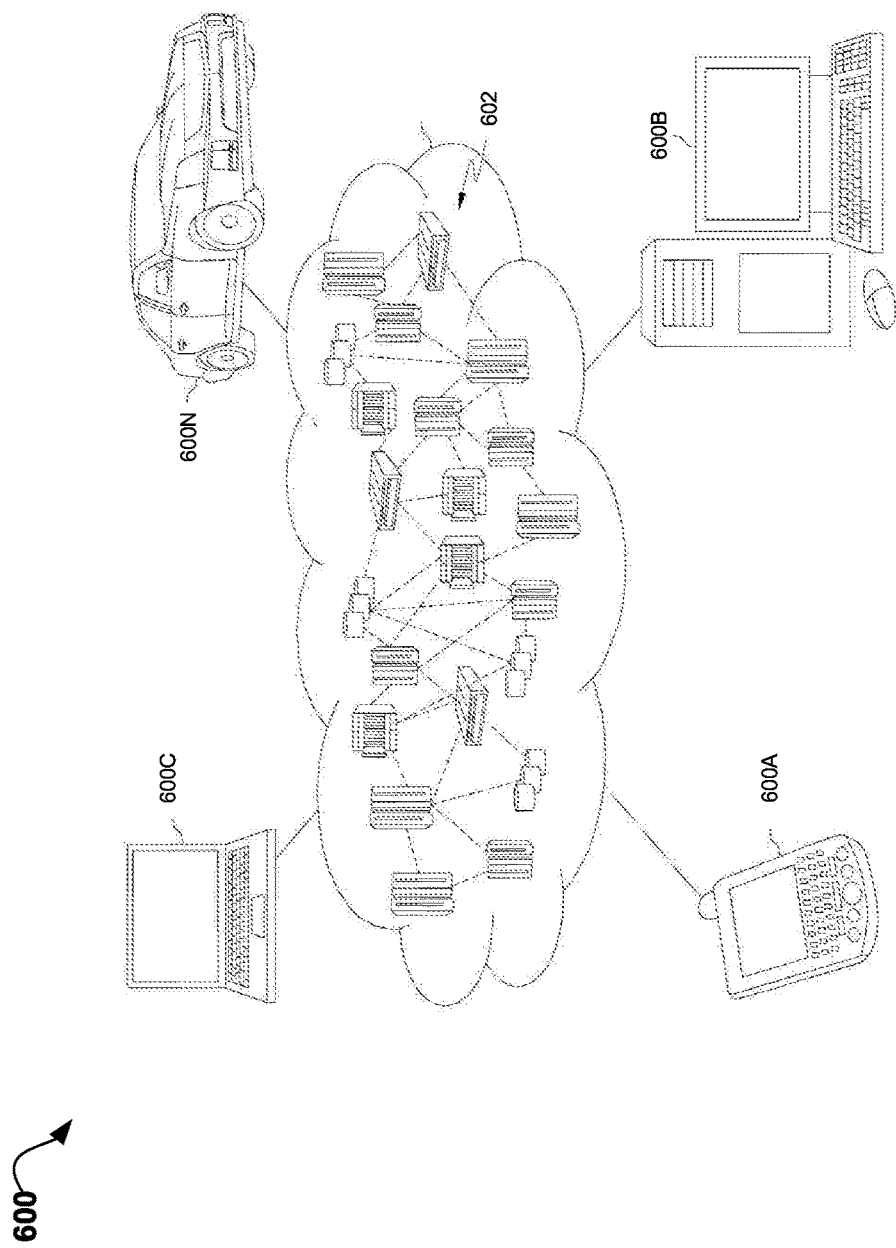
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
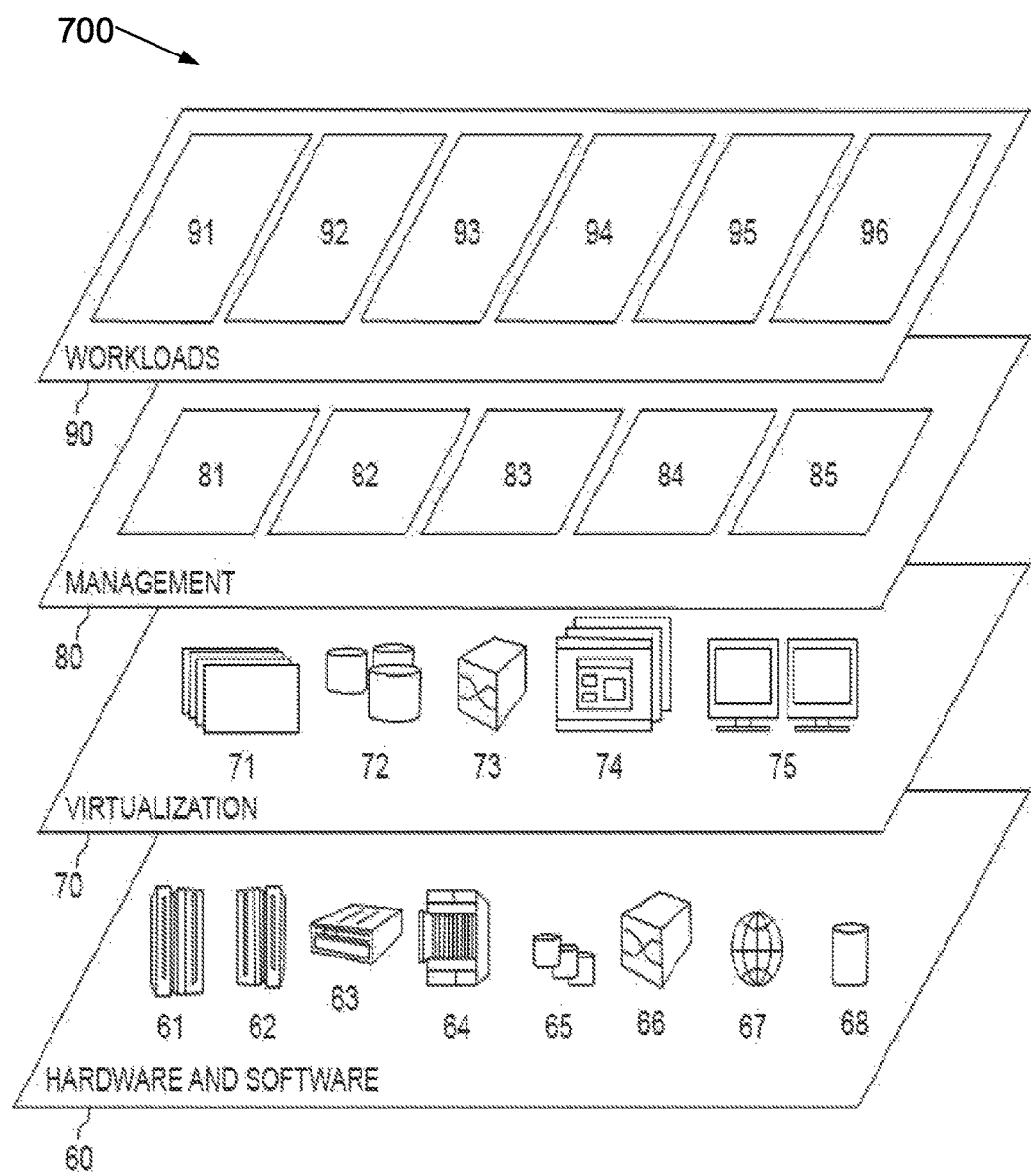
FIG. 7 is a block diagram of functional layers of the illustrative cloud computing environment of FIG. 6, in accordance with an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and error chain matching 96. An error chain matching program 108A, 108B (FIG. 1) may be offered as part of a PaaS platform for applications running on cloud and may resolve software problems by identifying and matching error chains.

Some embodiments of the present invention may include one, or more, of the following features, operations, characteristics and/or advantages: (i) related to errors or error chains and/or issues important to error chain comparison and/or level similar to error and error chain; (ii) matching is conducted at the error and error chain level; (iii) factors of the new distance metric proposed herein are used for matching that is conducted for sequences with elements of complex data structure, such as errors in an error chain; (iv) receiving a first string corresponding to a first error chain obtained from computer performance logging information, with the first error chain including a plurality of first-chain errors; (v) receiving a second string corresponding to a second error chain obtained from computer performance logging information, with the second error chain including a plurality of second-chain errors; (vi) comparing the first and second strings to obtain a minimum score to the second string that causes the second string to match the first string to obtain a set of distance value(s) (not a Levenshtein distance, Levenshtein distance is just a theoretically special case for the new and much more general formula proposed by the disclosure. Levenshtein distance does not work for error chain comparisons); (vii) the first error chain is included in an error chain database; (viii) determining, based at least in part upon the set of distance value(s), whether the second error chain is a sufficiently close match to the first error chain; (ix) on condition that there is a sufficient match between the first error chain and the second error chain, applying information from the error chain database to fix hardware and/or software involved in the computer operations that lead to the second error chain; (x) the comparison the first and second strings compares an entirety of the first string to an entirety of the second string to obtain a set of distance value(s) including only a single distance value; (xi) the comparison the first and second strings separately compares each first-chain error to each respectively corresponding second-chain error to obtain a set of distance value(s) respectively corresponding to each error; (xii) weighting each distance value of the set of distance value(s) based on a position of the corresponding error within the first and second error chains to obtain a set of weighted distance values; and/or (xiii) combining the set of weighted distance values to obtain a comprehensive weighted distance value.

Some embodiments of the present invention may include one, or more, of the following features, operations, characteristics and/or advantages: (i) provides a method to automatically identify whether a new problem is actually a known issue in a heterogeneous and complex computing environment, such as a cloud computing environment; (ii) designs an advanced Levenshtein distance algorithm to be used at different levels of granularity to effectively and reliably perform the error symptom matching no matter the error information is complete or not; (iii) devises a system to perform the error symptom matching efficiently; (iv) utilizes the user insights in its iterative process to achieve better matching results; and/or (v) applies character matching algorithms (for example, Levenshtein, or weighted Levenshtein) at different levels of granularity (for example, error chain level, individual error level) in determining degree of closeness between two error patterns that typically include multiple ordered chains and multiple ordered errors within each error chain.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for resolving at least one computer error, the method comprising:
receiving, by a computer, a plurality of stored error chains with each of the plurality of stored error chains including one or more stored errors and a sequential order of the one or more stored errors reflecting a different sequence of received computer errors associated with one or more computer systems;
receiving, by the computer, the at least one computer error and diagnostic data associated with the at least one computer error;
based on the received diagnostic data associated with the received at least one computer error, generating, by the computer, at least one error chain including a plurality of detected errors and a sequential order of the plurality of detected errors, with the at least one generated error chain reflecting a detected sequence of errors determined during operation of the one or more computer systems;
comparing, by the computer, the at least one generated error chain to the plurality of stored error chains to determine a matching condition, with the comparing including:
using a set of operation(s) to identify a match between the at least one generated error chain and one or more of the plurality of stored error chains,
based on the set of operation(s), weighing each of the plurality of detected errors associated with the at least one generated error chain and the one or more stored errors associated with the plurality of stored error chains, with the weighing being based, at least in part upon product configuration information associated with the one or more computing systems and a position for each of the plurality of detected errors with respect to the at least one generated error chain and each of the one or more stored errors with respect to the plurality of stored error chains, such that one or more detected errors associated with the plurality of detected errors at a first or last position in the at least one generated error chain have greater weights than the one or more detected errors at intermediate positions with respect to the at least one generated error chain, and the one or more stored errors at a first or last position in the plurality of stored error chains have greater weights than the one or more stored errors at intermediate positions with respect to the plurality of stored error chains,
based on the weighing, comparing, by the computer, the at least one generated error chain to the plurality of stored error chains to determine the matching condition,
ranking, by the computer, a plurality of resolutions associated with the plurality of stored error chains based on the determined matching condition;
presenting, by the computer, a ranked list of the plurality of resolutions with respect to the at least one generated error chain; and
executing, by the computer, at least one resolution associated with the plurality of resolutions to the at least one computer error based on user selection of the at least one resolution from the ranked list.

2. The method of claim 1 further comprising:
responsive to receiving the at least one computer error, receiving an error symptom matching request:
responsive to the error symptom matching request, collecting the diagnostic data from at least one user and at least one client computing system affected by the at least one computer error.

3. The method of claim 1 further comprising:
in response to the at least one resolution failing to resolve the at least one computer error, determining to generate additional error chains associated with the at least one computer error.

4. A computer program product for resolving at least one computer error, comprising:
one or more non-transitory computer-readable storage mediums and program instructions stored on at least one of the one or more non-transitory computer-readable storage mediums, the program instructions executable by a processor, the program instructions comprising:
program instructions to receive a plurality of stored error chains with each of the plurality of stored error chains including one or more stored errors and a sequential order of the one or more stored errors reflecting a different sequence of received computer errors associated with one or more computer systems;
program instructions to receive the at least one computer error and diagnostic data associated with the at least one computer error;
based on the received diagnostic data associated with the received at least one computer error, program instructions to generate at least one error chain including a plurality of detected errors and a sequential order of the plurality of detected errors, with the at least one generated error chain reflecting a detected sequence of errors determined during operation of the one or more computer systems;
program instructions to compare the at least one generated error chain to the plurality of stored error chains to determine a matching condition, with the comparing including:
program instructions to use a set of operation(s) to identify a match between the at least one generated error chain and one or more of the plurality of stored error chains,
based on the set of operation(s), program instructions to weigh each of the plurality of detected errors associated with the at least one generated error chain and the one or more stored errors associated with the plurality of stored error chains, with the weighing being based, at least in part upon product configuration information associated with the one or more computing systems and a position for each of the plurality of detected errors with respect to the at least one generated error chain and each of the one or more stored errors with respect to the plurality of stored error chains, such that one or more detected errors associated with the plurality of detected errors at a first or last position in the at least one generated error chain have greater weights than the one or more detected errors at intermediate positions with respect to the at least one generated error chain, and the one or more stored errors at a first or last position in the plurality of stored error chains have greater weights than the one or more stored errors at intermediate positions with respect to the plurality of stored error chains,
based on the weighing, program instructions to compare the at least one generated error chain to the plurality of stored error chains to determine the matching condition,
program instructions to rank a plurality of resolutions associated with the plurality of stored error chains based on the determined matching condition;
program instructions to present a ranked list of the plurality of resolutions with respect to the at least one generated error chain; and
program instructions to execute at least one resolution associated with the plurality of resolutions to the at least one computer error based on user selection of the at least one resolution from the ranked list.

5. The computer program product of claim 4 further comprising:
responsive to receiving the at least one computer error, program instructions to receive an error symptom matching request:
responsive to the error symptom matching request, program instructions to collect the diagnostic data from at least one user and at least one client computing system affected by the at least one computer error.

6. The computer program product of claim 4 further comprising:
program instruction to, in response to the at least one resolution failing to resolve the at least one computer error, determine to generate additional error chains associated with the at least one computer error.

\* \* \* \* \*